United States Patent [19]
Kröger

[11] Patent Number: 5,239,895
[45] Date of Patent: Aug. 31, 1993

[54] ENGINE CONTROL METHOD AND ARRANGEMENT

[75] Inventor: Torsten Kröger, Stuttgart, Fed. Rep. of Germany

[73] Assignee: Mercedes-Benz AG, Fed. Rep. of Germany

[21] Appl. No.: 937,755

[22] Filed: Sep. 1, 1992

[30] Foreign Application Priority Data

Sep. 7, 1991 [DE] Fed. Rep. of Germany ....... 4129784

[51] Int. Cl.$^5$ .............................................. F16H 59/48
[52] U.S. Cl. ..................................................... 74/858
[58] Field of Search .................................. 74/857, 858

[56] References Cited

U.S. PATENT DOCUMENTS

| | | | |
|---|---|---|---|
| 3,763,720 | 10/1973 | Aono et al. | 74/857 |
| 4,266,447 | 5/1981 | Heess et al. | 74/858 |
| 4,750,598 | 6/1988 | Danno et al. | 74/857 X |
| 5,038,287 | 8/1991 | Taniguchi et al. | 364/424.1 |
| 5,133,227 | 7/1992 | Iwatsuki | 74/858 X |
| 5,136,897 | 8/1992 | Boardman | 74/858 X |

FOREIGN PATENT DOCUMENTS 2848624  5/1980  Fed. Rep. of Germany .
3018033  11/1981  Fed. Rep. of Germany .
3512603  4/1985  Fed. Rep. of Germany .

*Primary Examiner*—Dirk Wright
*Attorney, Agent, or Firm*—Evenson, McKeown, Edwards & Lenahan

[57] ABSTRACT

An arrangement and method for controlling a driving engine—in the sense of reducing the torque when changing, to a higher gear, a step-change gearbox located downstream in the force path,—generates a gear-change recognition signal for the recognition of the gear-changing procedure and determining the beginning of the reduction exclusively by analysis of the variation of the engine rotational speed suppresses that signal on the appearance of rotational speed variations not caused by gear changing.

9 Claims, 3 Drawing Sheets

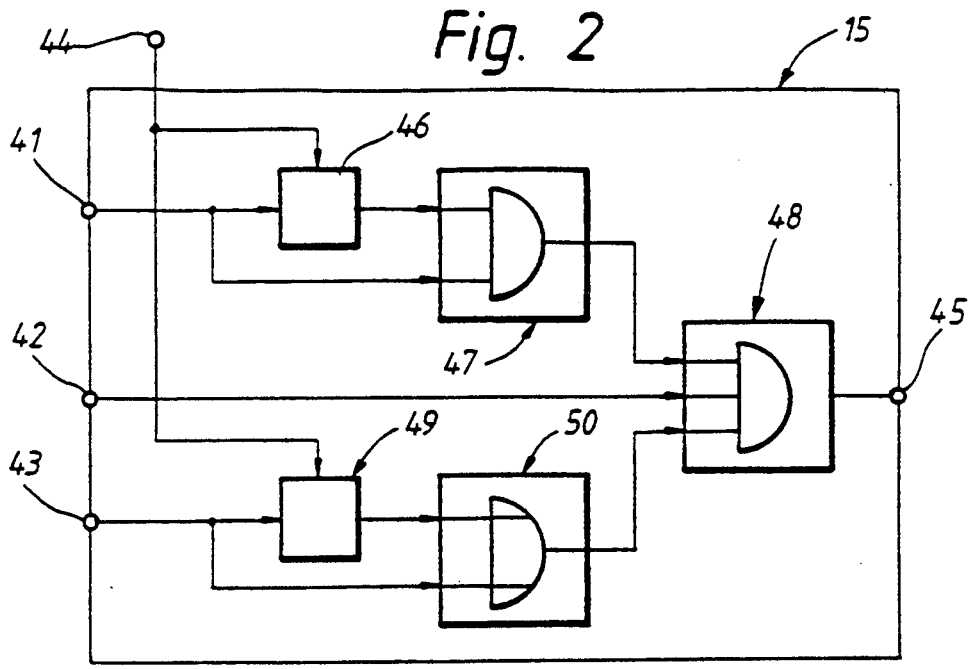
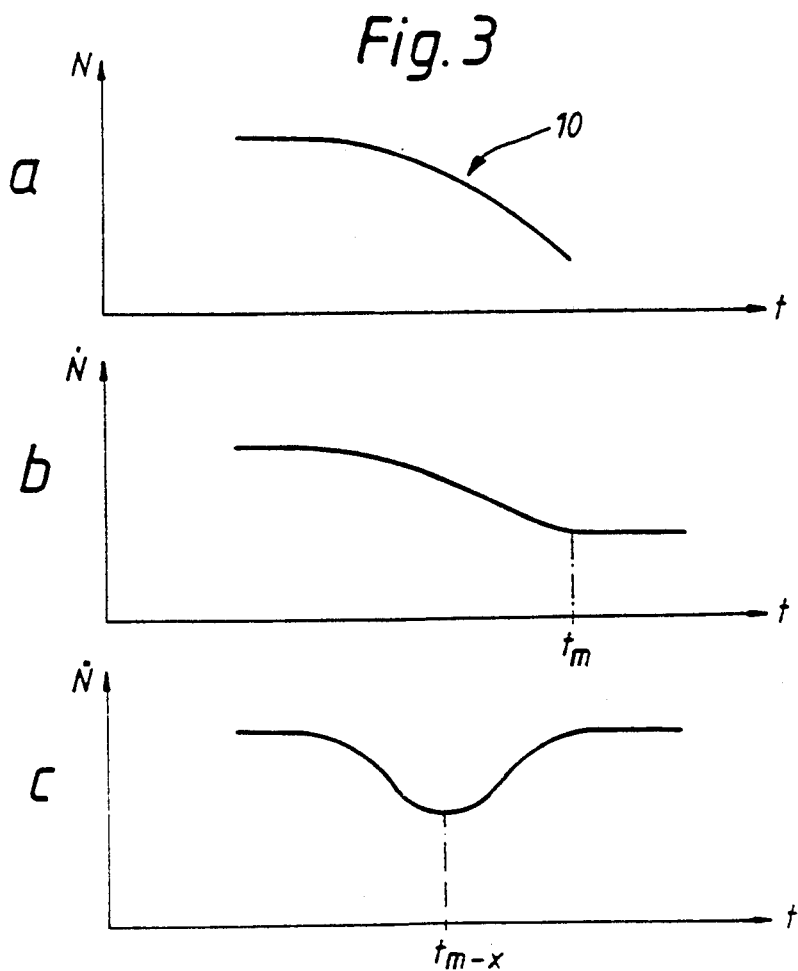

$$[\Delta N(n) \geqslant x] \wedge [\Delta N(n-1) \geqslant x]$$
$$\Delta N(n) + \Delta N(n-1) \geqslant 2y$$
$$[\Delta N(n) \geqslant z] \vee [\Delta N(n-1) \geqslant z]$$
$$\text{mit } 0 < x < y < z < 2y$$

ENGINE CONTROL METHOD AND ARRANGEMENT

BACKGROUND AND SUMMARY OF THE INVENTION

The present invention relates to an arrangement and method for controlling an internal combustion engine for reducing engine torque when changing, to a higher gear, a step-change gearbox located downstream in a force path of a transmission, comprising means for issuing an initiation signal to cause an actuator to reduce the engine torque, means for forming the initiation signal from signals dependent on an engine operating point and from a gear-change recognition signal indicating the beginning of change to a higher gear, means for obtaining the gear-change recognition signal solely by analyzing variation of engine rotational speed from a rotational speed parameter dependent on a decrease over time of the engine rotational speed.

In a known controlling arrangement described in DE-PS 35 12 603, an actuator is connected to control apparatus exclusively dependent on the rotational speed and engine load of the internal combustion engine and only cause the actuator to reduce the engine torque in the full-load range of the internal combustion engine, the control apparatus is connected to the actuator by comparator circuits for rotational speed changes negative with time such that the reduction of the engine torque is only released above a limiting value of the rotational speed changes negative with time. In this known arrangement, the control apparatus and additional comparator circuits for rotational speed changes positive with time are connected to the actuator so that the reduction of the engine torque is inhibited above a limiting value of the rotational speed changes positive with time.

This known arrangement essentially achieves a reduction in the heat generated in the friction components by a reduction of the engine torque which cannot be perceived by the driver, i.e. one within the time of the gear change executed. This avoids an unintended reduction of the engine torque being initiated due to overshoot phenomena, e.g. after a sudden selection of full throttle from the part-load range.

In the known arrangement, the rotational speed gradient is used as the rotational speed parameter in the analysis of the variation of the engine rotational speed. Negative reductions in rotational speed due to drive train vibrations, and excited by the vehicle wheels, are still not taken into account.

It has now been found that because of various tolerances in the drive train system, it is not yet possible, using an analysis of the first derivative of the engine rotational speed with respect to time, to select the magnitude of the threshold value and the time window for determining the rotational speed gradient so that a reliable initiation of the action in the engine takes place for each gear change and erroneous initiation due to rotational speed fluctuations caused otherwise (for example by surface waves) is avoided and that the initiation takes place with the speed, relative to the beginning of the gear change, necessary to minimize the thermal load on the friction components. The maximum thermal load on the friction component making the selection occurs at the beginning of the gear change when changing to a higher gear under load because the friction surfaces are then rotating with the maximum relative rotational speed.

An object on which the present invention is to provide an arrangement and method which recognizes a change to a higher gear as reliably and rapidly as possible from the variation of the engine rotational speed.

The foregoing object has been achieved by the present invention in an advantageous manner by providing that the rotational speed parameter is dependent upon the second time derivative of the engine rotational speed and the means for obtaining the gear-change recognition signal is configured such that the analysis takes place over at least two sequential scanning cycles with formation of cycle-specific values ($\Delta N_{(n)}$ and $\Delta N_{(n-1)}$) of the rotational speed parameter ($N_{ex}-N$) while using at least two different threshold values (x, y, z) such that, in each scanning cycle used for the analysis, a comparison takes place between the cycle-specific values ($\Delta N_{(n)}$) and at least one of the threshold values (x, y, z), whereby the gear-change recognition signal appears when the cycle-specific values ($\Delta N_{(n)}$) are above the associated threshold values (x, y, z) and the gear-change recognition signal is suppressed if at least one of the cycle specific values ($\Delta N_{(n)}$ or $\Delta N_{(n-1)}$) is smaller than one of the threshold (x, y, z).

In the arrangement and method according to the present invention, the characteristic variation of the engine rotational speed at the beginning of a gear change to a higher gear is given special consideration by the analysis of the second derivative of the engine rotational speed with respect to time because the second derivative reaches its minimum, during the gear change, earlier than the first derivative or than the engine rotational speed itself so that the beginning of the gear change is recognized as early as possible. In the arrangement according to the invention, a significant change to the engine rotational speed is recognized whenever the new rotational speed value remains under the extrapolated value by certain thresholds over two scanning cycles, for example, signal fluctuations being filtered out.

In the case of changes to a higher gear which are initiated by the selector device, gentler entries into gear changes can be expected from the outset because of the possibility of gear changes under load between two adjacent gears following rapidly in sequence. In such changes to higher gears, therefore, the condition for the initiation of the torque reduction can be limited to the lower threshold values so that there is a higher initiation sensitivity. This, however, is not disadvantageous in the case of the selector-initiated changes to higher gears because, under these conditions, a possibly premature initiation of the torque reduction is not noticeable in a negative manner with respect to comfort.

DETAILED DESCRIPTION OF THE DRAWINGS

These and other objects, features and advantages of the present invention will become more apparent from the following detailed description of a currently preferred embodiment when taken in conjunction with the accompanying drawings wherein:

FIG. 2 is a schematic diagram of an analysis stage in the form of an electronic circuit for the arrangement of FIG. 1;

Figure 1:
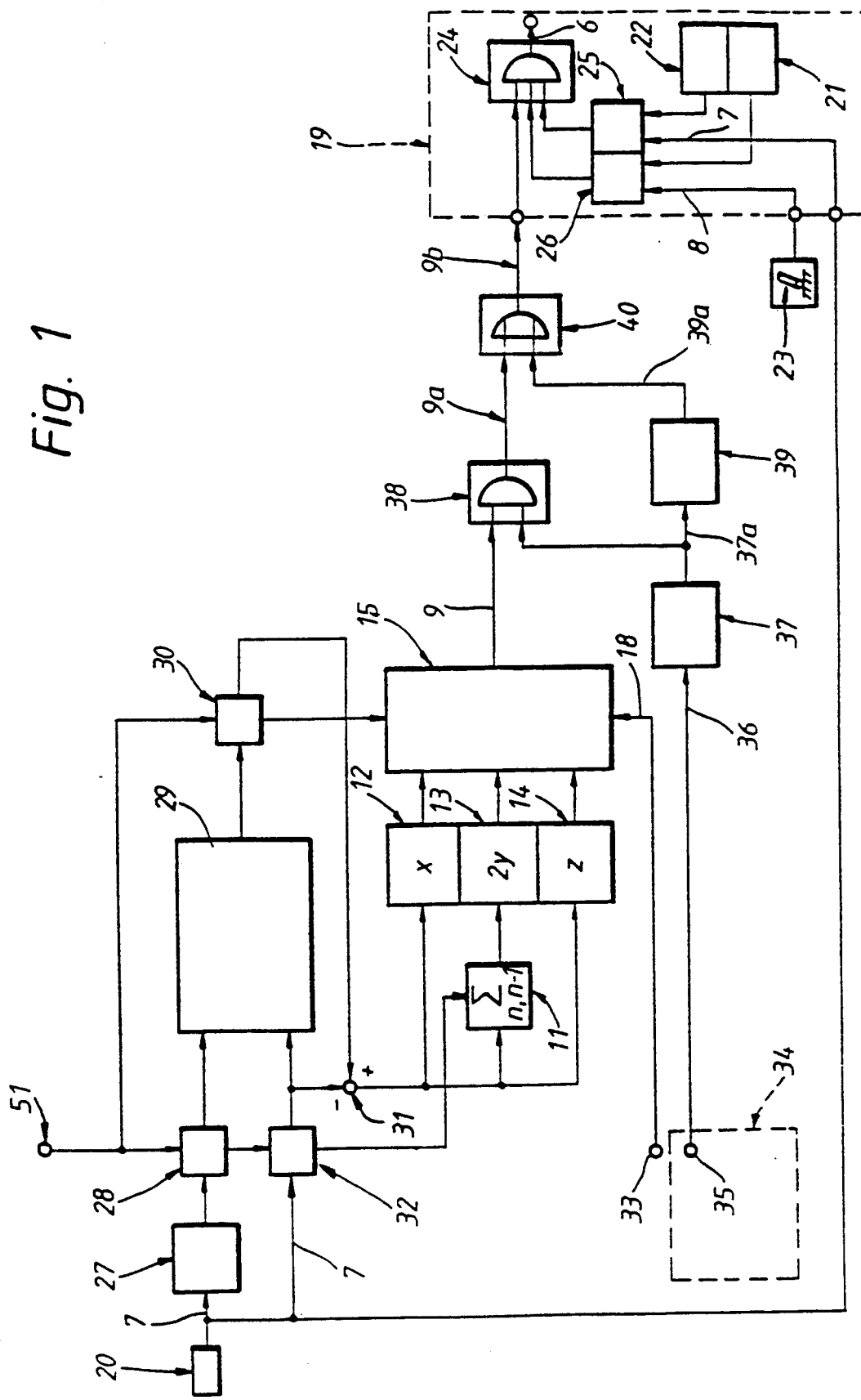
FIG. 1 is a schematic block circuit diagram of an arrangement according to the present invention, for controlling a driving engine during a change to a higher gear.
Figures 4, 5:
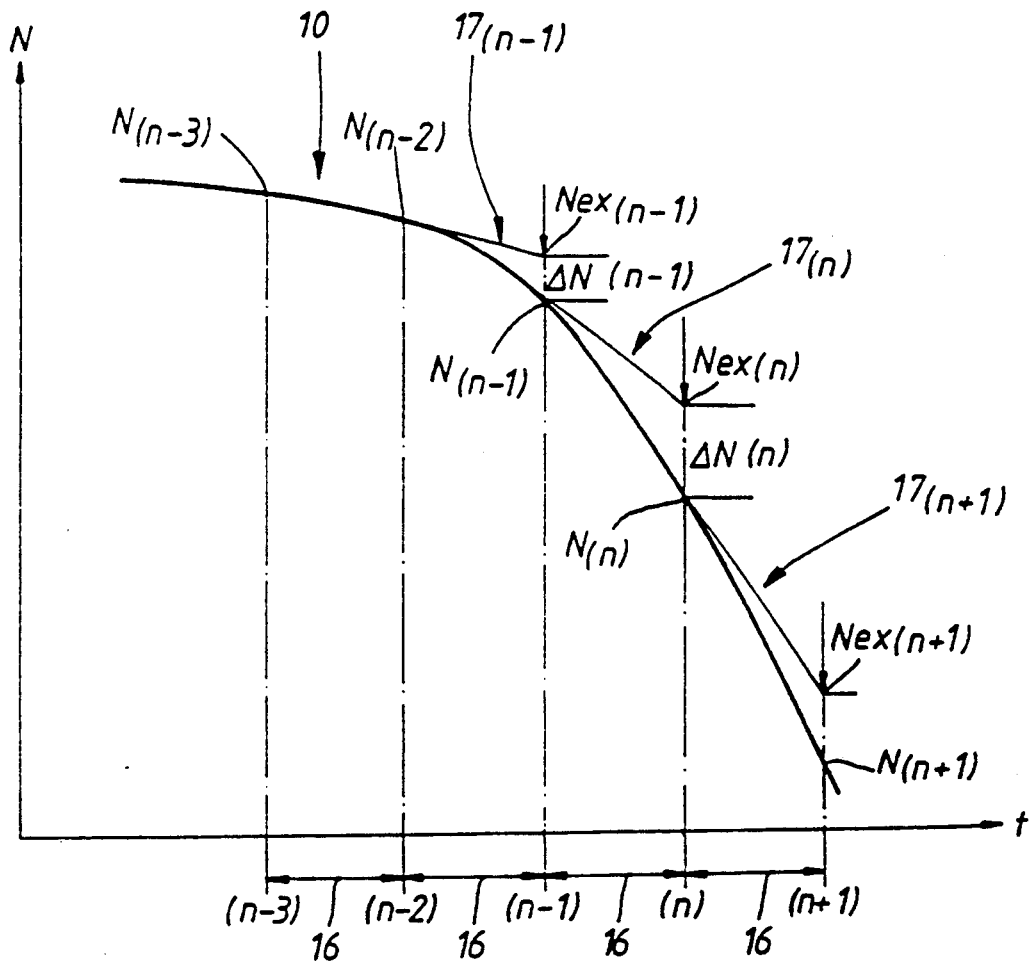

FIGS. 3A, 3B and 3C comprise three diagrams comparing the variation of the engine rotational speed and its derivatives with respect to time;

FIG. 4 is a graph of the determination of cycle-specific values of a rotational speed parameter dependent on the second derivative of the engine rotational speed with respect to time, carried out by the arrangement of FIG. 1; and FIG. 5 is a tabular representation of the conditions under which the analysis stage of the arrangement of FIG. 1 emits an output signal for forming a gear-change recognition signal.

DETAILED DESCRIPTION OF THE DRAWINGS

For sake of clarity, only a switching stage 19 of an electronic ignition switching device and a rotational speed sensor 20 for generating a signal 7 dependent on the engine rotational speed N of a driving engine of a motor vehicle are shown. The switching stage 19 has threshold value stages 21 and 22, inputs for the engine rotational speed signal 7, for a signal 8 dependent on the engine load or on the position of an accelerator pedal 23 and for an input signal 9b dependent on a gear-change recognition signal 9. The switching stage 19 also has an AND element 24 and comparator stages 25, 26. The comparator stages 25, 26 and the input receiving the input signal 9b are connected to the inputs of the AND element 24. When the engine operating point (signals 7, 8) is located in a region of the engine characteristic field fixed by the threshold value stages 21, 22 and the input signal 9b is present, an initiation signal 6 appears at the output of the AND element 24. This causes a characteristic field switchover in the ignition switching device such that the ignition angles are now read from a special characteristic field tuned to the changes to higher gears in the sense of an adjustment to "retard". The output of the rotational speed sensor 20 carrying the signal 7 for the engine rotational speed is also connected to a differentiating stage 27 and to a sample and hold stage 32.

The output of the differentiating stage 27 is connected via a further sample and hold stage 28 to a computing stage 29, which is, in turn, connected via a further sample and hold stage 30 to an input of a summation element 31. The output of the sample and hold stage 32 is also connected to the computing stage 29 and to the other input of the summation element 31. The output of the summation element 31 is connected to a threshold value stage 12, to a computing stage 11 and to a further threshold value stage 14. At its output end, the computing stage 11 is connected to a further threshold value stage 13. The threshold value stages 12 to 14 are connected, at their output end, to an analysis stage 15 which supplies the gear-change recognition signal 9 at its output, which is connected to one of two inputs of an AND element 38. The output of the AND element 38 emitting an output signal 9a is connected to one input of an OR element 40 whose output emitting the signal 9b is connected to the corresponding input of the threshold value or switching stage 19.

A selector device operated manually for inhibiting gears of the automatic step-change gearbox driven by the driving engine is provided with a gear-change contact 33 at which a gear-change signal 18 appears when a change to a higher gear is initiated by the gear-change device. The analysis stage 15 can be subjected to the gear-change signal 18.

During a change to a higher gear initiated by the gearbox control 34 of the step-change gearbox, a gear-change signal 36 appears at a contact 35 and this signal is applied to a delay element 37 whose output signal 37a is connected to both the other input of the AND element 38 and to the input of a second delay element 39. The output signal 39a of the second delay element 39 is connected to the other input of the OR element 40.

The analysis stage 15 as shown in more detail in FIG. 2 has inputs 41 to 44 and an output 45 and two cycled time elements 46 and 49 (e.g. shift registers), two AND elements 47 and 48 and an OR element 50. The input 41 is connected to the output of the threshold value stage 12 as well as to the input of the time element 46 and to the input of the AND element 47. The other input of the AND element 47 is connected to the output of the time element 46, and the output of the AND element 47 is connected to one of three inputs of the AND element 48.

The input 42 is connected to the output of the threshold value stage 13 and to the second input of the AND element 48. The input 43 is connected to the output of the threshold value stage 14 and to the input of the time element 49 as well as to one input of the OR element 50. The other input of the OR element 50 is connected to the output of the time element 49, and the output of the OR element 50 is connected to the third input of the AND element 48 where the output, in turn, is connected to the output 45 of the analysis stage 15 for the gear-change recognition signal 9.

The input 44 of the analysis stage 15 is connected, together with one input each of the computing stage 11 and the sample and hold stages 28, 30 and 32, to a clock-pulse generator 51, on one hand, and to the cycled time elements 46 and 49, on the other.

The threshold value stage 12 has a relatively low threshold value x which corresponds to a certain rotational speed value difference $\Delta N = N_{ex} - N$ as explained below with reference to FIG. 4. The threshold value stage 14 has a relatively high threshold value z which corresponds to a certain higher rotational speed value difference $\Delta N$.

The threshold value stage 13 has an average threshold value y located between the threshold values x and z, such that $$0 < x < y < z < 2y.$$

Referring to FIG. 4, the computing stage 29 operates as follows. From the characteristic falling curve 10 of the engine rotational speed N during a change to a higher gear, a cycle-specific value $\Delta N$ of a rotational speed parameter dependent in the following manner on the second derivative of the engine rotational speed N with respect to time t is calculated for each scanning cycle 16 as now described.

From the values of the rotational speed gradient at the curve points $N_{(n-3)}$ and $N_{(n-2)}$ supplied by the differential element 27 via the sample and hold stage 28, a rotational speed gradient $17_{(n-1)}$ is calculated for the next scanning cycle $16_{(n-1)}$ under the assumption that the rotational speed gradient does not change between the curve points $N_{(n-2)}$ and $N_{(n-1)}$. A rotational speed value $N_{ex(n-1)}$ for the scanning cycle $16_{(n-1)}$ is extrapolated from this rotational speed gradient $17_{(n-1)}$. The difference $\Delta N_{(n-1)}$ is then formed by the summation element 31 from the extrapolated rotational speed value $N_{ex(n-1)}$ and the actual value $N_{(n-1)}$ of the engine rotational speed for the scanning cycle $16_{(n-1)}$; this difference is a pseudo-measure of the change with time of the rotational speed gradient 17 and therefore depends on the second derivative of the engine rotational speed N with respect to time t.

The determination of the cycle-specific value $\Delta N_{(n)}$ for the next scanning cycle $16_{(n)}$ takes place in the same way as that for the scanning cycle $16_{(n-1)}$. For each scanning cycle $16_{(n)}$, a rotational speed value $N_{ex(n)}$ extrapolated to the point in time n from the rotational speed gradient $17_{(n)}$ of the preceding scanning cycle $16_{(n-1)}$ is therefore calculated and the difference $\Delta N_{(n)}$ is then formed between this extrapolated value $N_{ex(n)}$ and the actual value $N_{(n)}$ of the engine rotational speed N for the same time.

The formation of a sliding total is undertaken in the computing stage 11 by forming, for each scanning cycle 16, the sum of the cycle-specific values $\Delta N_{(n)}$ and $\Delta N_{(n-1)}$ of all the scanning cycles 16 participating in the respective analysis, i.e. as a sliding total. In the following embodiment example, two scanning cycles $16_{(n)}$ and $16_{(n-1)}$ are provided for the respective analysis so that the sum $\Delta N_{(n)} + \Delta N_{(n-1)}$ is always formed in the computing stage 11, which is also cycled.

The cycle-specific values $\Delta N_{(n)}$, $\Delta N_{(n-1)}$ are compared with the threshold value x in the threshold value stage 12. In the case where the respective cycle-specific value is greater than the threshold value x, a level of "1" appears at the output of the threshold value stage 12; otherwise a level of "0" appears. This signal level is the input 41 of the analysis stage 15.

The sum values $\Delta N_{(n)} + \Delta N_{(n-1)}$ are compared with the value 2y (increased by the factor 2) in the threshold value stage 13. If the respective sum value is higher than the increased threshold value 2y, a level of "1" appears at the output of the threshold value stage 13; otherwise a level of "0" appears. This signal level is the input 42 of the analysis stage 15.

A comparison of the respective cycle-specific value $\Delta N_{(n)}$ and $\Delta N_{(n-1)}$ with the threshold value z takes place in the threshold value stage 14. If the value is greater than the threshold value z, a level of "1" appears at the output of the threshold value stage 14; otherwise a level of "0" appears. This signal level is the input 43 of the analysis stage 15.

In accordance with the conditions of the table in FIG. 5, the analysis stage 15 operates as follows. The signal level determined by the cycle-specific value $\Delta N_{(n)}$ is present at the input of the AND element 47 directly connected to the input 41 of the analysis stage 15 whereas the signal level determined by the cycle-specific value $N_{(n-1)}$ is present at the input of the AND element 47 connected to the time element 46. If the signal level "1" is present at both inputs of the AND element 47, the signal level "1" is also present at the associated input of the AND element 48. The signal level at the output of the threshold value stage 13, determined by the sum value $\Delta N_{(n)} + \Delta N_{(n-1)}$, is present at the second input of the AND element 48 connected to the input 42 of the analysis stage 15.

The signal level determined by the cycle-specific value $\Delta N_{(n)}$ is present at the input of the OR element 50 directly connected to the input 43 of the analysis stage 15. The signal level determined by the cycle-specific value $\Delta N_{(n-1)}$ is present at the input of the OR element 50 connected to the time element 49.

If one of the two signal levels has the value "1", the signal level "1" is also present at the associated input of the AND element 48. If, therefore, all three conditions of the table in FIG. 5 are satisfied, the gear-change recognition signal 9 appears at the output 45 of the analysis stage 15 and this signal is also present at one input of the AND element 38.

If, after the appearance of the first or primary gear-change signal 36, a delay period at the delay element 37 (which is determined by the duration of the filling process at the participating selector positioning element) has elapsed, the signal level "1" also appears at the other input of the AND element 38 so that the secondary gear-change recognition signal 9a appears at the output of the AND element 38. This secondary gear-change recognition signal 9a is connected via the OR element 40 in the form of the signal 9b to the associated input of the switching stage 19 to initiate the characteristic field switchover or torque reduction by adjusting the ignition to "retard".

The output signal 37a of the delay element 37 and the relevant level change "0"→"1" can also be used to trigger the further delay element 39 in order, nevertheless, to form a gear-change recognition signal (9b) via the OR element 40 after a certain period of time within which the gear-change recognition signal 9 has not appeared.

The time advantage in the recognition of a change to a higher gear or the recognition of the beginning of a change to a higher gear may be seen from the comparison of diagrams a, b and c in FIG. 3. In diagram a, in which the engine rotational speed N is plotted against time t, it is not possible to recognize when the curve 10 has reached a minimum. In diagram b, in which the first derivative N' of the engine rotational speed N with respect to time is plotted against time t, it may be seen that the curve has reached a minimum at the time $t_m$ at which the curve 10 in the diagram 3a has not yet reached its minimum (end of gear changing). Now, in diagram c, in which the second derivative N' of the engine rotational speed N with respect to time is plotted against time t, it may now be clearly recognized that the curve has reached a minimum at a much earlier point in time $t_{m-x}$ and that, therefore, an analysis will be able to recognize the beginning of a change to a higher gear very much earlier.

The inhibition signal 18 can act on the analysis stage 15 in such a way, for example, that its inputs 42 and 43 and the AND element 48 are disconnected and the output of the AND element 47 is directly connected to the output 45 for the gear-change recognition signal 9. In this way, only the threshold value stage 12 with the lowest threshold value x determines the condition for the initiation of the gear-change recognition signal 9 in the case of changes to a higher gear initiated by the selector device.

Although the invention has been described and illustrated in detail, it is to be clearly understood that the same is by way of illustration and example, and is not to be taken by way of limitation. The spirit and scope of the present invention are to be limited only by the terms of the appended claims.

I claim:

1. An arrangement for controlling an internal combustion engine for reducing engine torque when changing to a higher gear, a step-change gearbox located downstream in a force path of a transmission, comprising an actuator means for issuing an initiation signal to cause the actuator to reduce the engine torque, means for forming the initiation signal from signals dependent on an engine operating point and from a gear-change recognition signal indicating the beginning of change to a higher gear, and means for obtaining the gear-change recognition signal solely by analyzing variation of engine rotational speed from a rotational speed parameter dependent on a decrease over time of the engine rotational speed, wherein the rotational speed parameter is dependent upon the second time derivative of the engine rotational speed and the means for obtaining the gear-change recognition signal is configured such that the analysis takes place over at least two sequential scanning cycles with formation of cycle-specific values of the rotational speed parameter while using at least two different threshold values such that, in each scanning cycle used for the analysis, a comparison takes place between the cycle-specific values and at least one of the threshold values, whereby the gear-change recognition signal appears when the cycle-specific values are above the associated threshold values and the gear-change recognition signal is suppressed if at least one of the cycle-specific values is smaller than one of the threshold.

2. The arrangement according to claim 1, wherein the gear-change recognition signal obtaining means forms the cycle-specific values are as the difference between a value extrapolated from the rotational speed gradient of the engine rotational speed of the scanning cycle immediately preceding in time to a certain point in time of the current scanning cycle, and the actual value for the same point in time of the engine rotational speed.

3. The arrangement according to claim 1, wherein the gear-change recognition signal is initiated when the cycle-specific value in all the scanning cycles is greater than the lowest threshold value.

4. The arrangement according to claim 1, wherein the gear-change recognition signal obtaining means initiates the gear-change recognition signal when the cycle-specific value of at least one of the scanning cycles for the analysis is greater than the highest threshold value.

5. The arrangement according to claim 1, wherein the gear-change recognition signal obtaining means comprises an average threshold value between the at least two threshold values of different magnitude and initiates the gear-change recognition signal when the sum value of the cycle-specific values of the two sequential scanning cycles is greater than twice the value of the average threshold value, the value of twice the average threshold value being greater than the higher of the at least two threshold values adjacent to the average threshold value.

6. The arrangement according to claim 1, wherein the cycle-specific values are each compared with each threshold value.

7. The arrangement according to claim 1, wherein the gear-change recognition signal obtaining means utilizes two scanning cycles.

8. The arrangement according to claim 1, wherein the step-change gearbox comprises an automatic gear-change device with a manually actuated selector device for inhibiting gears the selector device being configured to permit selection of other gears, and the gear-change recognition signal obtaining means generates an inhibiting signal in response to a change to a higher gear initiated by the selector device to reduce the number of the threshold values actually participating in the analysis.

9. A method for controlling an internal combustion engine for reducing engine torque when changing, to a higher gear, a step-change gearbox located downstream in a force path of a transmission, comprising the steps of forming an initiation signal, from signals dependent on an engine operating point and from a gear-change recognition signal indicating the beginning of change to a higher gear to cause an actuator to reduce the engine torque, and obtaining the gear-change recognition signal solely by analyzing variation of engine rotational speed from a rotational speed parameter dependent on a decrease over time of the engine rotational speed, wherein the rotational speed parameter is dependent upon the second time derivative of the engine rotational speed and the step of obtaining the gear-change recognition signal includes the taking place over at least two sequential scanning cycles with formation of cycle-specific values of the rotational speed parameter while using at least two different threshold values such that, in each scanning cycle used for the analysis, a comparison takes place between the cycle-specific values and at least one of the threshold values, whereby the gear-change recognition signal appears when the cycle-specific values are above the associated threshold values and the gear-change recognition signal is suppressed if at least one of the cycle-specific values is smaller than one of the threshold.

* * * * *